United States Patent
He

(10) Patent No.: US 11,489,907 B1
(45) Date of Patent: Nov. 1, 2022

(54) SYSTEMS, METHODS, AND COMPUTER-READABLE STORAGE MEDIA FOR EXTRACTING DATA FROM WEB APPLICATIONS

(71) Applicant: FEDERAL HOME LOAN MORTGAGE CORPORATION (Freddie Mac), McLean, VA (US)

(72) Inventor: Qiming He, Gaithersburg, MD (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 0 days.

(21) Appl. No.: 17/316,663

(22) Filed: May 10, 2021

Related U.S. Application Data

(63) Continuation of application No. 12/486,494, filed on Jun. 17, 2009, now Pat. No. 11,005,910.

(60) Provisional application No. 61/129,286, filed on Jun. 17, 2008.

(51) Int. Cl.
| | |
|---|---|
| *H04L 67/02* | (2022.01) |
| *G06F 16/95* | (2019.01) |
| *H04L 67/56* | (2022.01) |
| *H04L 67/50* | (2022.01) |

(52) U.S. Cl.
CPC .............. *H04L 67/02* (2013.01); *G06F 16/95* (2019.01); *H04L 67/535* (2022.05); *H04L 67/56* (2022.05)

(58) Field of Classification Search
CPC ....... H04L 67/02; H04L 67/535; H04L 67/56; G06F 16/95
See application file for complete search history.

(56) References Cited

U.S. PATENT DOCUMENTS

| | | | |
|---|---|---|---|
| 5,930,768 | A | 7/1999 | Hooban |
| 6,199,077 | B1 | 3/2001 | Inala et al. |
| 6,412,073 | B1 | 6/2002 | Rangan |
| 6,725,425 | B1 | 4/2004 | Rajan et al. |
| 6,976,210 | B1 | 12/2005 | Silva et al. |
| 7,200,804 | B1 | 4/2007 | Khavari et al. |

(Continued)

OTHER PUBLICATIONS

Chinotec Technologies Co., "Parosproxy.org—Web Application Security", 2004, archived Jun. 11, 2007 and accessed Jan. 14, 2012 at http://web.archive.org/web/20070611103902/http://www.parosproxy.org/functions.shml.

(Continued)

*Primary Examiner* — Abdulkader M Alriyashi
(74) *Attorney, Agent, or Firm* — Finnegan, Henderson, Farabow, Garrett & Dunner, LLP

(57) ABSTRACT

Systems, methods, and computer-readable media are disclosed for extracting data from web applications. An exemplary embodiment includes monitoring web traffic between a client terminal and a server, the web traffic corresponding to a user's interaction with a web browser to send a request for data, such as a web page, from the client terminal to the server. A data log is created reflecting the monitored web traffic, and processed to extract the request for data. A command is generated for accessing the server based on the request for the data that was extracted from the data log. When the generated command is executed, it downloads the data from the server to the client terminal. Some embodiments are able to specify a pattern to search for in the downloaded web page, search the downloaded data for the pattern to identify data of interest and provide the identified data to a user.

17 Claims, 11 Drawing Sheets

(56) References Cited

U.S. PATENT DOCUMENTS

| | | |
|---|---|---|
| 2002/0191015 A1 | 12/2002 | Brown et al. |
| 2004/0111488 A1 | 6/2004 | Allan |
| 2004/0139169 A1 | 7/2004 | O'Brien et al. |
| 2006/0031442 A1 | 2/2006 | Ashley et al. |
| 2007/0106692 A1 | 5/2007 | Klein |
| 2008/0064501 A1 | 3/2008 | Patel |
| 2009/0248396 A1 | 10/2009 | Fujiwara et al. |

OTHER PUBLICATIONS

Stenberg, "cURL—Tutorial", Apr. 26, 2007, archived Jun. 1, 2007 and accessed Jan. 19, 2012 at http://web.archive.org/web/20070601194930/http://curl.haxx.se/docs/httpscripting.html.

Squid-cache.org, "squid: Optimising Web Delivery", May 19, 2007, archived Jun. 9, 2007 and accessed Jan. 20, 2012 at http://www.squid-cache.org/Scripts/.

Jigen et al., email thread "Curl: Searching google result", Sep. 18, 2007, accessed Jan. 20, 2012 at http://curl.haxx.se/mail/curlphp-2007-09/0039.html and http://curl.haxx.se/mail/curlphp-2007-09/0040.html and http://curl.haxx.se/mail/curlphp-2007-09/0041.html.

V. Anupam et al., "Automating Web Navigation with the WebVCR," Bell Laboratories, (11 pgs.), http://www9.org/w9cdrom/208/208.html, downloaded from Internet on Jul. 2, 2009.

New Approach to Web Applications, (5 pgs.), http://www.adaptivepath.com/ideas/essays/archives/000385.php, Feb. 18, 2005, downloaded from Internet on Jul. 2, 2009.

GnuPG, "The GNU Privacy Guard," (2 pgs.), GnuPG 2.0.12 Released Jun. 17, 2009, http://www.gnupg.org/, downloaded from Internet on Jul. 2, 2009.

"Open Financial Exchange," (1 pg), http://www.ofx.net//, downloaded from Internet on Jul. 2, 2009.

"Quicken Personal Finance Software," (1 pg.), http://quicken.intuit.com//, downloaded from Internet on Jul. 2, 1999.

D. Kristol, Bell Laboratories, Lucent Technologies, "HTTP State Management Mechanism," (25 pgs.). Oct. 2000, http://www.ietf.org/rfc/rtc2965.txt?number//, downloaded from Internet on Jul. 2, 2009.

https://www.abc123bank.com/home.html

300

| Corporate |
| Personal |
| Retrieve |

Small business loans
Payroll accounts
Accounting services

Mortgages
Checking
Savings
CDs

IRA
401k
Roth IRA
Annuities userid — 301

Password — 302

FIG. 3 https://www.abc123bank.com/my_accounts.html

Robert John Smith - Accounts

| Checking | $2,433.00 — 501 |
| Savings | $6,927.00 — 502 |
| Roth IRA | $19,225.00 — 503 |
| 401k | $6,925.00 — 504 |

601 { GET https://www.abc123bank.com/ HTTP/1.1
Host: www.abc123bank.com

602 { HTTP/1.1 200 OK
Content-Type text/html
(contents of www.https://www.abc123bank.com/home.html)

603 { POST /login.jsp HTTP1.1
Host: www.abc123bank.com
userid=bobsmith&password=mypassword 604 { HTTP/1.1 200 OK
Content-Type text/html
(contents of www.abcbank.com/welcome.html)

605 { GET https://www.abc123bank.com/myaccounts HTTP/1.1
host www.abc123bank.com 606 { HTTP/1.1 200 OK
Content-type text/html
(contents of www.abc123bank.com/my_accounts.html)

701 —⌇— curl –k –c cookie "https://www.abc123bank.com/"

702 —⌇— export submit=userid='bobsmith'&password='mypassword'

703 —⌇— curl -b cookie -d $submit "https://www.abc123bank.com/login.jsp/"

704 —⌇— curl -b cookie "https://www.abc123bank.com/myaccounts.html"

801 — 1. cat myaccounts.html |grep "Positions for Account" |egrep -o ">[A-Z]{2,100}<" |sed -e 's/>//g' -e 's/<//g' > tmp 802 — 2. cat myaccounts.html |grep -o "401(k):" >> tmp 803 — 3. cat -n tmp > account 804 — 4. cat myaccounts.html |egrep "Balances for Account" |egrep -o '\$[0-9,.]+'|cat -n > balance 805 — 5. join account balance

```perl
#!/usr/bin/perl
$agent='"Mozilla/4.0 (compatible; MSIE 6.0; Windows NT 5.1; SV1; .NET CLR 1.1.4322; .NET CLR 2.0.50727)"';
$curloption="-k -stderr -b cookie -c cookie";

system("\rm -f cookie output.html");
open(PROXYLOG, "./paros/filter/message.txt");     #Open the file
open(EXCLUDEPAGE, "exclusion.txt");
open(HTTPREPLAY, ">curlfin.sh");

while (<EXCLUDEPAGE>){chop $_; $exclude{$_}=$_;}   #exclude page extension in hash $htmlpage="output.html";                          #sequence number of html page print HTTPREPLAY "#!/bin/sh\n";                   #generate a script to interact with target website
emualte MSIE which works for most of website
print HTTPREPLAY "export agent='Mozilla/4.0 (compatible; MSIE 6.0; Windows NT 5.1; SV1; .NET CLR 1.1.4322; .NET CLR 2.0.50727)'\n";

while (<PROXYLOG>){
    chop $_;
    if(/GET http/){
        @line=split / /,$_;
        $url=$line[1];
        /\.[a-z]+\s+/;
        $ext=$&;
        $ext=~s/\.|\s+//g;
        next if exists $exclude{$ext};            #exclude scriptlet, e.g., css, js etc.
        system("/usr/bin/curl $curloption -A $agent '$url' > $htmlpage");
        print HTTPREPLAY "/usr/bin/curl $curloption -A \$agent '$url' > $htmlpage \n";
        $header{'Referer'}=$url;

open(HTMLPAGE, "$htmlpage");
        %namevalue=();                            #nullify name-value pairs before hitting each page
```

```
while (<HTMLPAGE>){
    chop $_;
    if(/type="hidden"/){
        /name=\"([^\s.]+)\"/; #look for name="xxxx"
        $name=$&;
        /value=\"([^\s.]+)\"/; #look for value="xxxx"
        $value=$&;
        $name=~s/name=\"//g;
        $value=~s/value=\"//g;
        $value=~s/\"//g;
        $namevalue{$name}=$value;
    }
}
close(HTMLPAGE);
}elsif(/POST http/){          #each request-response block
    @line=split /\s+/;
    $url=$line[1];
    /\.[a-z]+\s+/;            #web page extension
    $ext=$&;
    $ext=~s/\.|\s+//g;
    next if exists $exclude{$ext};    #exclude scriptlet, e.g., css, js etc.
    while(1){
        $_=<PROXYLOG>;
        last if /HTTP\/1/;    #HTTP POST request hits HTTP 1.X response, bail out
        for ($_) {s/^\s+//; s/\s+$//g;} #strip out all spaces;
        if(/:/){
        }elsif(/=/){          #post parameters
            @param=split /&/, $_;
            $submit="";
            foreach(@param){  #
                @tmp=split /=/;
                if (exists $namevalue{$tmp[0]} && $namevalue{$tmp[0]}){ #only append non-empty hidden val in POST
                    print HTTPREPLAY "export $tmp[0]=`cat $htmlpage | grep hidden |grep $tmp[0] \ \| |egrep -o
                    'value=\"\"|value=\".+'|sed -e 's/value=//g' -e 's/\"//g'\\|sed -e 's/+/%2B/g' -e
                    's/\\//%2F/g' -e 's/=/%3D/g'\n"; #need to do entire urlencoding
                    $submit=$submit."$tmp[0]=\$$tmp[0]&";
                }else{
                    $submit=$submit."$tmp[0]=$tmp[1]&";
                }
            }
        }
    }
}
```

FIG. 9B

```
$submit=~s/\&$//; #strip the last & in submit string
      print HTTPREPLAY "export submit=\"$submit\"\n";
   }
   system("curl $curloption -d '$submit' -e '$header{'Referer'}' '$url' > $htmlpage");
   print HTTPREPLAY "curl $curloption -d \$submit -e '$header{'Referer'}' '$url' > $htmlpage \n";
  }
}
close(PROXYLOG);# Close the file
```

SYSTEMS, METHODS, AND COMPUTER-READABLE STORAGE MEDIA FOR EXTRACTING DATA FROM WEB APPLICATIONS

CROSS-REFERENCE TO RELATED APPLICATION(S)

This application is a continuation of U.S. patent application Ser. No. 12/486,494, filed Jun. 17, 2009(now allowed), which claims the benefit of priority from U.S. Provisional Application No. 61/129,286, entitled "SYSTEMS, METHODS, AND COMPUTER-READABLE STORAGE MEDIA FOR EXTRACTING DATA FROM WEB APPLICATIONS," filed Jun. 17, 2008, the entire contents of which are expressly incorporated herein by reference.

BACKGROUND

I. Technical Field

The present disclosure generally relates to extracting data from web pages. More particularly, the disclosure relates to systems, methods, and computer-readable storage media for downloading web pages from a server and extracting data from the downloaded web pages.

II. Background Information

In general, a web application may be thought of as an application delivered to users from a web server over a network such as an intranet or the Internet. The output of the web application may be in the form of one or more web pages that are sent from the web server to a client terminal. Web applications are beneficial in one respect in that they are a part of a server-based computing model in which application processing, administration, support and deployment are based on a central server.

A user of a web application interfaces with the web application through a web browser such as Microsoft Internet Explorer™ or Mozilla Firefox™. The user's system is usually referred to as a thin client, since very little processing of the web application is actually done on the user's system, but is instead done on the server. Through the web browser, the user views and works with the downloaded web pages to communicate with the web application. Data are sent over the network connection between the user's system and the server using web pages or other file formats.

Web applications have been adopted and used by many industries, including the financial industry. For example, web applications are used within the financial industry by banks to provide their customers with access to their financial accounts, by investment companies to allow their customers access to mutual fund or equity accounts, and by credit card companies to allow their customers access to their line of credit. Moreover, not only do individual users interact with different financial entities using web applications, but so do enterprises.

A problem with the use of web applications is that typically, web applications do not provide an application programming interface (API) that supports data request made by other applications. Instead, the web interface to the web application provided for human operators through the web browser is generally the only access point available to collect data. Accordingly, data is not easily transferred from one web application to another application. Because of this, in order for users to collect data from different web applications, the user must access each web application separately and manually copy (e.g., using handwritten or typed notations, or a copy and paste human-computer interaction) the desired data. This highly repetitive manual process results in wasted resources and increases the likelihood of errors concerning the completeness and accuracy of the data being collected.

Accordingly, there is a need for a solution that provides for the automation of data extraction from web applications, among other needs. In particular, the solution may be provided using non-interactive scripts capable of running against multiple web applications sequentially. The scripts may be either manually generated by developers or automatically generated.

SUMMARY

Consistent with embodiments of the invention, a method, computer-readable medium, and client terminal are provided for extracting data from web applications. The method may include monitoring, by a computer system, web traffic between a client terminal comprising a web browser and a server comprising a web page, the web traffic corresponding to a user's interaction with the web browser to send a request for the web page from the client terminal to the server; creating a data log reflecting the web traffic that was monitored between the client terminal and the server; processing, by the computer system, the data log to extract the request for the web page from the monitored web traffic; generating a command for accessing the server based on the request for the web page extracted from the data log; executing, by the computer system, the command which downloads the web page from the server.

The computer-readable medium may include instructions for causing a processor to implement a method comprising monitoring web traffic between a client terminal comprising a web browser and a server comprising a web page, the web traffic corresponding to a user's interaction with the web browser to send a request for the web page from the client to the server; creating a data log reflecting the web traffic that was monitored between the client and the server; processing the data log to extract the request for the web page from the monitored web traffic; and generating a command for accessing the server based on the request for the web page extracted from the data log.

The client terminal may include a web browser configured to request a web page from a server; a proxy server configured to: monitor web traffic between a web browser on the client terminal and a server comprising a web page, the web traffic corresponding to a user's interaction with the web browser to send a request for the web page from the client terminal to the server; and create a data log reflecting the web traffic that was monitored between the client terminal and the server; a log processor configured to: process the data log to extract the request for the web page from the monitored web traffic; and generate a command for accessing the server based on the request for the web page extracted from the data log.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 3 illustrates an exemplary web page, consistent with certain embodiments of the invention;

FIG. 5 illustrates an exemplary web page, consistent with certain embodiments of the invention;

FIG. 6 illustrates an exemplary data log, consistent with certain embodiments of the invention;

FIG. 7 illustrates an exemplary data retrieval script, consistent with certain aspects of the invention;

FIG. 8 illustrates exemplary shell commands, consistent with certain embodiments of the invention; and FIGS. 9A-C illustrate an exemplary log processing script, consistent with certain embodiments of the invention.

DETAILED DESCRIPTION

Reference will now be made in detail to the exemplary embodiments of the invention, examples of which are illustrated in the accompanying drawings. Wherever convenient, the same reference numbers will be used throughout the drawings to refer to the same or like parts.

Figure 1:
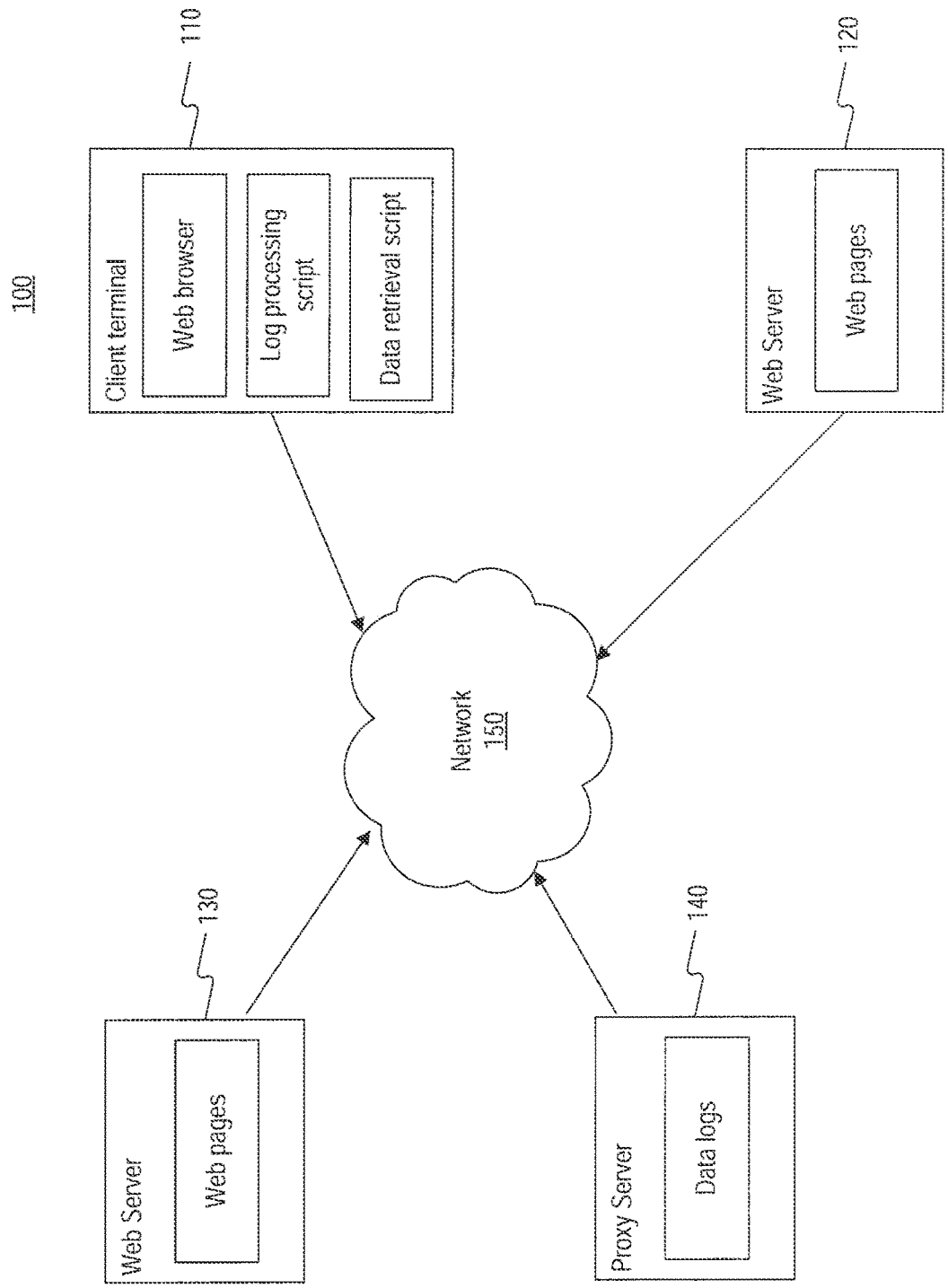
FIG. 1 is a block diagram of an exemplary system, consistent with certain embodiments of the invention.

FIG. 1 illustrates a block diagram of an exemplary system environment that comprises a computer system 100, consistent with an embodiment of the invention. Computer system 100 may include a client terminal 110. Client terminal 110 may be operated by a user who interacts with a web browser to communicate with a proxy server 140 over a network 150. Proxy server 140 may in turn communicate with a web server 120 and a web server 130 to forward HTTP traffic between client terminal 110 and web servers 120 and 130. In some embodiments, proxy server 140 does not execute on a separate machine, but rather is embodied as software executing locally on client terminal 110. In such embodiments, references to communications across network 150 between client terminal 110 and proxy server 140 may be implemented by sharing data between the local proxy server and web browser applications.

Although FIG. 1 shows a particular number and arrangement of components, other arrangements and numbers of components could be used to implement embodiments of the invention. For example, there may be various numbers of client terminals 110, web servers 120 and 130, and proxy servers 140. Client terminal 110, web servers 120 and 130, and proxy server 140 may be general-purpose computers including one or more processors, memory, and storage devices. Network 150 may be a wired or wireless network or any combination thereof, such as a home or office LAN in communication with the Internet.

Communications over network 150 may be formatted according to the Hypertext Transfer Protocol (HTTP). For a more secure communications, Hypertext Transfer Protocol over Secure Socket Layer (HTTPS) may also be used. Web servers 120 and 130 may operate by accepting requests from the client computer and providing an HTTP response. Resources such as web applications and web pages may be accessed using HTTP.

HTTP defines eight methods indicating the desired action to be performed on the identified resource. The eight methods are:

HEAD Asks for the response identical to the one that would correspond to a GET request, but without the response body;

GET Requests a representation of the specified resource;

POST Submits data to be processed (e.g., from an HTML form) to the identified resource;

PUT Uploads a representation of the specified resource;

DELETE Deletes the specified resource;

TRACE Echoes back the received request, so that a client can see what intermediate servers are adding or changing in the request;

OPTIONS Returns the HTTP methods that the server supports for specified

Uniform Resource Identifier (URI); and

CONNECT Converts the request connection to a transparent TCP/IP tunnel, usually to facilitate HTTPS through an unencrypted HTTP proxy.

A user at client 110 may access web server 120 and web server 130 to request various private data, such as their bank account balances. Because web servers 120 and 130 may not make this private data available through an API, it may be difficult to programmatically extract the data. Thus, embodiments of the invention may monitor the user's HTTP traffic as the user accesses their private data on web servers 120 and 130. In some embodiments, proxy server 140 performs the monitoring function. By storing a record of the series of web pages accessed by the user, along with any passwords or login ID's used to access the private data, it is possible to generate a program that can subsequently access the private data without requiring the user to personally navigate through the series of web pages. In this way, the user's initial access of their private data serves as an example that is used to create a program that can repeatedly access the private data, by taking steps analogous to those taken by the user. Once the program is created, subsequent access to the private data can be achieved simply by executing the generated program.

The generated program may not necessarily rely on a web browser to access the private data. Instead, the generated program may be in the form of a series of commands to a non-interactive HTTP-enabled command-line utility (NHCU), such as cURL or wget. In the exemplary disclosed embodiment, cURL commands are used to implement the program. The generated series of cURL commands may be used to automate access to web servers 120 and 130, and may include commands to provide authentication data such as a username and password.

As the generated cURL program is executed, a copy of the web page including the private data will be downloaded by the program. In one embodiment, the downloaded web page may be parsed to look for the private data, which may be enclosed by some special tag(s). Thus, the cURL program emulates human interaction to obtain output of a web application (presented as HTML pages) that contains private data such as user account information. In one embodiment, the user may use command-line utilities such as Unix parsing scripts (e.g. grep, egrep, etc.) to access the desired data from the downloaded web page.

Because web applications may differ significantly, for example, in web server/middleware, authentication mechanism, and site structure, it is often not possible to apply one successfully automated solution for one web site to another web site. Depending on the complexity of page flow and session tracking mechanism, automating data retrieval from arbitrary web applications/pages is typically unpredictable and difficult to automate. Using the disclosed embodiments, users can manually navigate through different web interfaces once to create a record of HTTP traffic that is required to access the desired data. Subsequent processing of the HTTP record can be used to generate a program that can automate future accesses to the private data.

Figure 2:
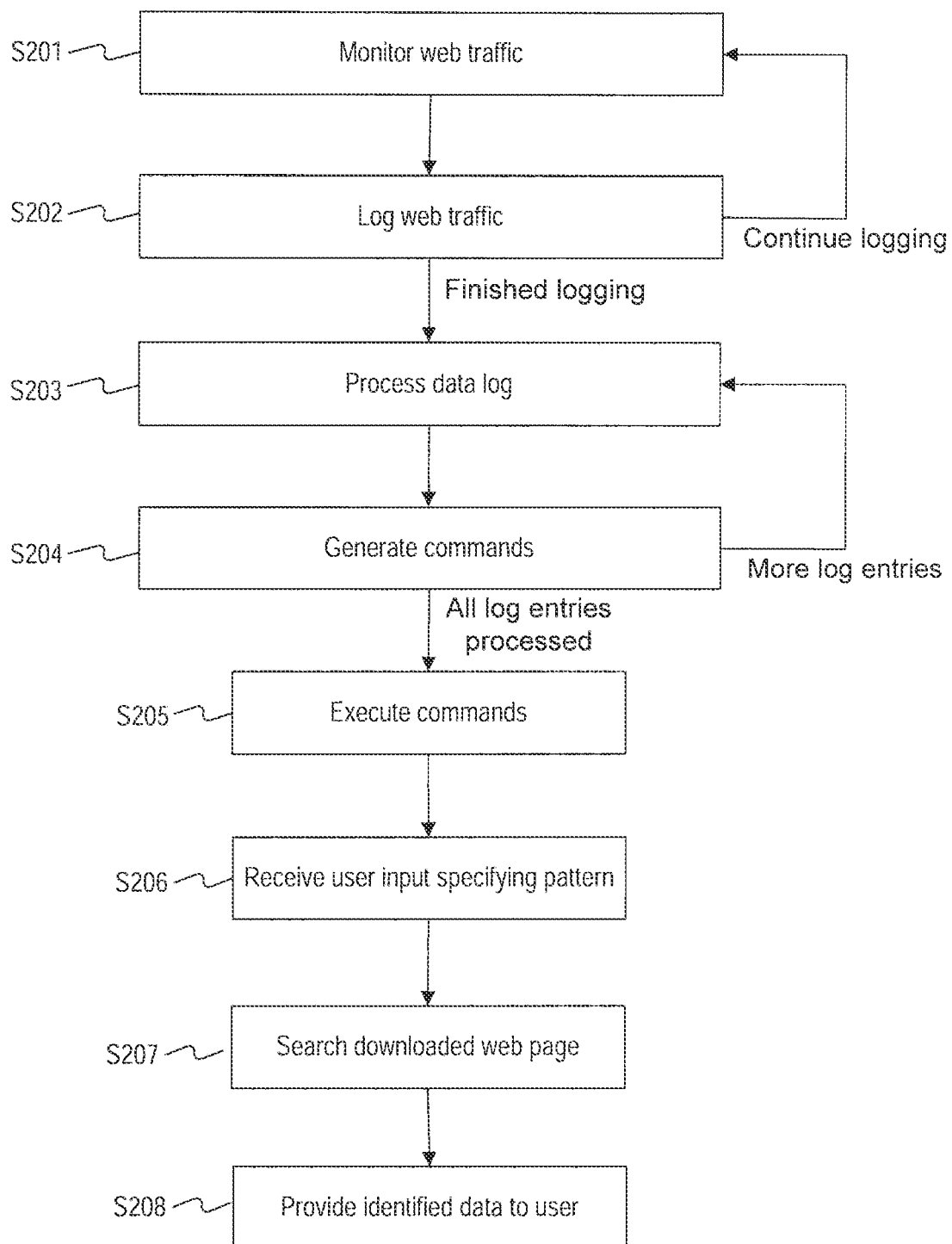
FIG. 2 is a flowchart of an exemplary method, consistent with certain embodiments of the invention.

FIG. 2 is an exemplary flowchart of a method 200, consistent with an embodiment of the invention. FIG. 2 illustrates an exemplary method for automating access to data available from a web server.

As shown in FIG. 2, method 200 starts with step S201 by monitoring web traffic between, for example, client terminal 110 and web servers 120 and 130. For example, a user at client terminal 110 may use the web browser on client terminal 110 to access their bank account information. The user may have an online banking account at a website "abc123bank.com," hosted on web server 120. The user may access various web pages hosted by web server 120 to view various details about their accounts. As the web traffic between client terminal 110 and web server 120 is routed through proxy server 140, proxy server 140 is able to monitor the web traffic.

For example, the user may first type "www.abc123bank.com" in their web browser address bar. Client terminal 110 may send an HTTP GET request across network 150 to proxy server 140. Proxy server 140 may in turn route the GET request to web server 120. Server 120 may send a home page, such as home page 300 shown in FIG. 3, back to proxy server 140, which in turn forwards home page 300 to client terminal 110. Client terminal 110 then displays a rendering of home page 300 to the user at client terminal 110.

As the user accesses the various web pages available from web server 120, the method implements step S202. At step S202, proxy server 140 creates data logs reflecting the web traffic between client terminal 110 and web server 120. Proxy server 140 may store both the HTTP traffic sent from client terminal 110 to web server 120, and the traffic sent from web server 120 to client terminal 110. Referring to FIG. 6, an exemplary data log 600 is shown. For example, data log 600 may have an entry 601 corresponding to the HTTP GET request for the www.abc123bank.com home page, as well as an entry 602 corresponding to the response from web server 120. Note that data log 600 is illustrated with only a subset of the HTTP fields useful for explaining certain features of the disclosed embodiments. In some embodiments, data log 600 may include a complete record of HTTP traffic, rather than the limited fields illustrated in FIG. 6.

Once entries 601 and 602 are made in the data log, proxy server 140 determines whether or not to continue logging data. In some embodiments, the user at client terminal 110 may determine whether proxy server 140 continues to log data. In other embodiments, automated processes may be used to determine when data logging may be completed. In the current example, assume the user decides to continue logging data, and method 200 goes back to step S201.

Figure 4:
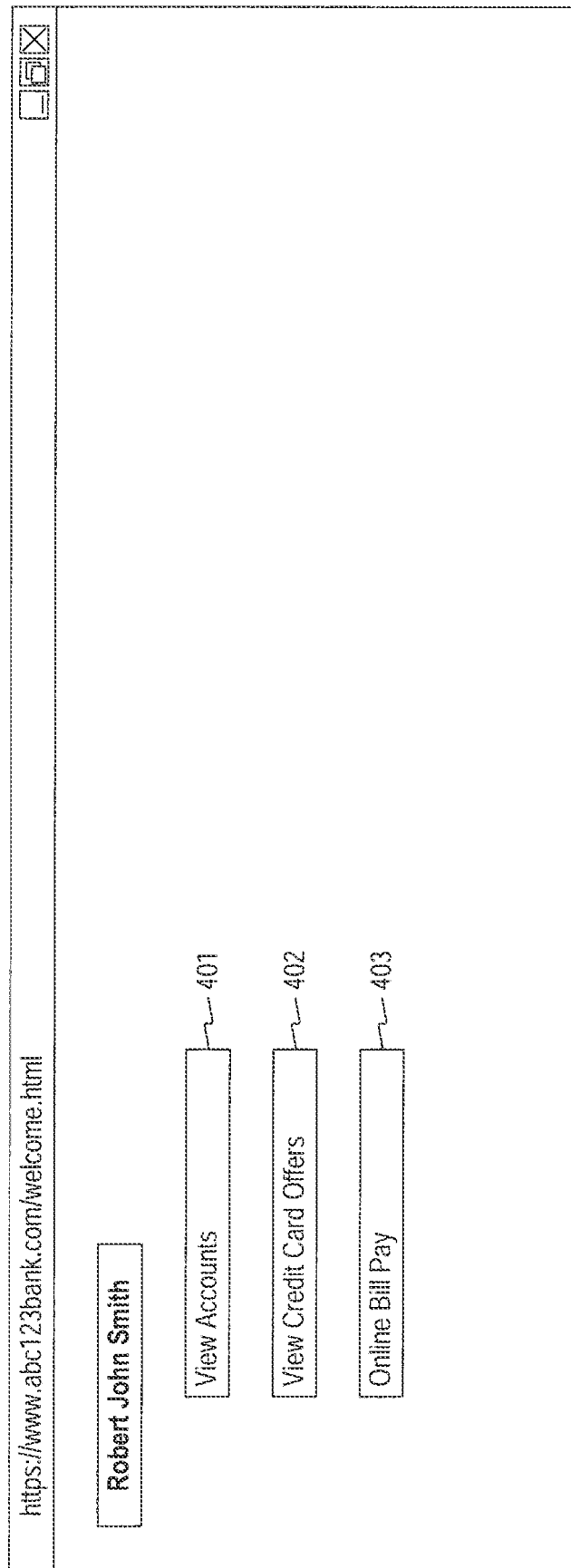
FIG. 4 illustrates an exemplary web page, consistent with certain embodiments of the invention.

As method 200 goes back to step S201, the user is viewing home page 300 at client terminal 110, while proxy server 140 continues to monitor HTTP traffic between client terminal 110 and web server 120. The user may decide that they wish to access their personal account information on the abc123bank web site. The user then enters their personal log-in ID ("userid") into field 301, and their password into field 302. The user may then press the "enter" key on their keyboard, and client terminal 110 may send an HTTP POST command including the log-in ID and password across network 150 to proxy server 140. Proxy server 140 may in turn forward the POST command to web server 120. Web server 120 may authenticate the user and determine that the user may access their personal account information on web server 120. As an entry point to the user's account data, web server 120 may send welcome page 400 to client terminal 110 through proxy server 140 and network 150. Welcome page 400 is illustrated in FIG. 4.

As the user accesses welcome page 400, the method again moves to step S202. At step S202, proxy server 140 adds new entries 603 and 604 to data log 600, reflecting the web traffic between client terminal 110 and web server 120. Entry 603 corresponds to the HTTP POST used to send the userid ("bobsmith") and password ("mypassword") to server 120. Entry 604 may correspond to the response from web server 120, and is included in the HTTP traffic that sends welcome page 400 to client terminal 110.

Again, assume the user decides to continue logging data, and the method returns to step S201. Note that, as the user views welcome page 400, the user does not yet have access to their account balances. In order to view their account balances, the user may select "view accounts" element 401 in welcome page 400. Client terminal 110 may then send an HTTP GET request through network 150 and proxy server 140, and web server 120 will respond with accounts page 500, as shown in the example of FIG. 5. Accounts page 500 may include account balances for checking account 501, savings account 502, Roth IRA 503, and 401(k) 504.

As the user accesses accounts page 500, the method again moves to step S202. At step S202, proxy server 140 adds new entries 605 and 606 to data log 600, reflecting the recent web traffic between client terminal 110 and web server 120. Entry 605 may correspond to the HTTP GET request sent to web server 120 to request accounts page 500. Entry 606 may correspond to the response from web server 120 that sent accounts page 500 to client terminal 110.

At this point, data log 600 includes a complete record of the HTTP traffic required to access the user's account balances from web server 120. Accordingly, the user may choose to stop logging web traffic at proxy server 140. In the embodiment used for this example, the user may retrieve data log 600 from proxy server 140 for subsequent processing at client 110.

Although the foregoing description describes steps S201 and S202 as occurring sequentially for ease of understanding, it is within the scope of the invention for steps S201 and S202 (as well as other steps) to be performed simultaneously or in an overlapping manner.

Once the user has retrieved data log 600, method 200 moves to step S203. At step S203, client terminal 110 may process data log 600 using a log processing script 900, shown in FIGS. 9A-C. Log processing script 900 may be implemented as a computer program, for example in a scripting language such as Perl or Python. While languages such as Perl or Python that include support for regular expressions may be particularly well-suited for log processing script 900, general-purpose languages such as C, C++, or Java may also be used. As discussed below, log processing script 900 may generate a sequence of commands 700 (FIG. 7) for subsequently accessing the user's financial data on web server 120. The commands may be generated as the output of log processing script 900, and the commands may be stored for later use, such as by writing each command sequentially to a file.

In the embodiment shown, log processing script 900 begins processing data log 600 at step S203, by searching data log 600 for HTTP requests and responses, and in particular extracts each HTTP GET and POST request. For example, log processing script 900 may use a regular expression such as "/GET http/" to match log entry 601. Log processing script 900 may also process corresponding response entry 602 at this point. Each GET and POST request generally corresponds to HTTP traffic previously sent over network 150 as the user navigated through the various web pages. GET requests may generally correspond to simple navigation between web pages, such as by clicking a link in a web page. In contrast, POST requests may include parameters, such as userid and password, that are necessary to navigate to the next web page. In some cases, POST requests act to pass parameters to web applications on web server 120. Note that data log 600 may include a complete record of the HTTP traffic (including GET and POST requests) that is required to navigate through the www.abc123bank.com web site to retrieve personal account data.

At step S204, log processing script 900 may generate commands 700 for accessing web server 120 using the cURL command line utility. The generated cURL commands may generally correspond to the various entries in data log 600. Once the commands 700 are generated, they may collectively serve as a way of "replaying" the user's interaction with their web browser. Thus, the series of generated commands 700, including cURL commands, can be executed to retrieve web pages 400, 500, and 600 in the same sequence as the user. As discussed in more detail below, both data log 600 and the generated cURL commands may include not only the user's browsing history, but also their userid and password.

The first cURL command generated by log processing script 900 may correspond to the HTTP GET request reflected by log entry 601, i.e. the user's initial access of www.abc123bank.com/home.html. FIG. 7 illustrates a cURL command 701 that may be generated by log processing script 900 to access home page 300 from www.abc123bank.com. cURL command 701 may be the first entry in data retrieval script 700. As discussed below, subsequent commands 702, 703, and 704 may be appended to data retrieval script 700 by continuing to process data log 600 using log processing script 900.

As additional log entries remain unprocessed, method 200 may continue to process data log 600 and generate commands at steps S203 and S204. Once all of the entries in data log 600 have been processed, method 200 may move to step S205 to execute the commands. Continuing with our example, data log 600 still has unprocessed log entries 603-606, so method 200 will return to step S203 to continue processing data log 600.

At step S203, log processing script 900 will move to the next unprocessed HTTP request/response pair in data log 600, i.e. log entries 603 and 604. Log processing script 900 will determine that the HTTP request in log entry 603 is a POST request, and extract the userid "bobsmith" and password "mypassword" strings from log entry 603. Again, log processing script 900 may use regular expressions such as (/userid/) and (/password/) to find the appropriate location in log entry 601 of the userid and password.

At step S204, log processing script 900 may generate a shell command 702 to enter the userid and password into a variable "submit." Log processing script 900 may also generate a cURL command 703 to post the submit variable, including the userid and password, to web server 120. Commands 702 and 703 may be stored as the second and third entries in data retrieval script 700.

As there are remaining unprocessed entries in data log 600, the method again moves back to step S203. Log processing script 900 processes the HTTP request/response pair 605 and 606. Log processing script 900 may match the HTTP GET command in log entry 605. At step S204, log processing script 900 will generate a corresponding cURL command 704, for accessing account page 500. cURL command 704 may be appended to data retrieval script 700.

At this point, all of the log entries in data log 600 have been processed, and method 200 may move to step S205. At step S205, client terminal 110 may execute the generated data retrieval script 700, for example, at the request of the user, to automatically access the user's accounts page 500. Note that data retrieval script 700 may be stored as a file for subsequent execution at later times, and may be executed repeatedly whenever the user wishes to download their account information from www.abc123bank.com. cURL script 700 may thus serve to "replay" the actions of the user as the user browsed through the www.abc123bank.com web site at steps S201 and 202, without requiring the user to repeatedly manually perform each step. Thus, by simply executing cURL script 700, the user is able to automatically download a new copy of accounts page 500 at any time after the user initially goes through the manual browsing at steps S201 and S202.

Once the user has the downloaded accounts page 500, the method moves to step S206. In step S206, the user may enter commands to extract specific data from a web page into client terminal 110, such as shell commands 800 as illustrated in FIG. 8. In the example shown, note that shell commands 800 refer to accounts page 500 as "myaccounts.html." The shell commands may include user-specified patterns for identifying pertinent data in accounts page 500. The shell commands may be, for example, user-entered C-shell, bourne-shell, or korn-shell commands.

Next, method 200 moves to step S207, where the shell commands are executed to search the downloaded accounts page 500. Shell command 801 may perform pattern matching to find the positions of various accounts in the HTML code of accounts page 500, and store these positions in a variable called "tmp." Subsequent commands 802-804 extract 401(K) balance 504 out of accounts page 500.

At step S208, the identified data based on the user patterns is provided to the user. For example, the user may enter command 805, which combines the name of the account "401(k)" with the account balance to create an output string such as "401(k): $6,925.00," matching the value for 401(k) balance 504 shown in FIG. 5. Thus, the output string is an exemplary way of providing the identified data to the user. In an alternative embodiment, steps S206-S208 may be replaced by a step that displays the downloaded web page, for example using a web browser.

Discovery and Replay

Steps S201 and S202 of method 200 may serve as a method of "discovering" how to interact with a web site to obtain particular data of interest to a user. Web server 120 may not make the user's account data available through an API. Therefore, using traditional techniques, it would be difficult for a programmer to create a program that can automate access the account data without first studying the various web links the user follows to access the account data, as well as obtaining their userid and password. By logging the user's interactions as they access their account a single time, steps S201 and S202 "discover" and record the necessary steps to access the account data.

Steps 203 and S204 may serve as a method of automating the steps discovered in steps S201 and s202. Log processing script 900 iterates through the data log and creating a series of commands (cURL commands in one embodiment) that perform analogous steps to those taken by the user and recorded at steps S201 and S202. These commands then serve as a data retrieval script that can be executed over and over again to automatically retrieve the desired web page, e.g., accounts web page 500.

Step S205 may serve as a method to "replay" automatically the user's interactions with web server 120 recorded at steps S201 and S202. As the data retrieval script is executed, the cURL commands will perform analogous steps as those taken by the user to access the various web pages from web server 120. Subsequent steps S206-S208 may serve as a method for retrieving data of interest from the downloaded web pages, for example by matching user-specified patterns to the downloaded HTML pages.

By "discovering" and then "replaying" the sequence of web pages in this manner, web server 120 can be repeatedly accessed for the user's account data without requiring web server 120 to implement an API or other particularized data format. Rather, because the data retrieval script is based on the user's interactions when accessing web server 120, the data retrieval script is automatically tailored to the www.abc123bank.com web site. Thus, regardless of the number of web pages that must be navigated or the number of authentication credentials that need to be supplied to a web site to access particular data of interest, method 200 can create a data retrieval script that can retrieve the data.

Further, note that by using pattern matching at the client, the downloaded web pages also do not need to conform to an agreed-on protocol or formatting. Rather, the user can simply customize their grep/egrep or other pattern-matching commands for the particular format of the web page they wish to process. Thus, for example, the user may use the "$" character to identify the various balances available from accounts page 500. If a web page were downloaded from a different web site that did not use the "$" character, the user could modify their shell commands accordingly. For example, if the downloaded web page used the abbreviation "USD" in place of "$," the user could enter shell commands at step S206 with the text "USD" in place of "$."

A Second Example

In the example discussed above, the user had to negotiate through three different web pages, e.g. home page 300, welcome page 400, and accounts page 500. In addition, the user had to upload a single set of authentication credentials, i.e. their userid and password. Thus, method 200 had to "discover" these three web pages, as well as a single set of authentication credentials. However, in some cases, users may have to access more web pages, and upload more than a single set of credentials, in order to get to their desired data.

As a second example, assume web server 130 hosts a web site called "www.jonesstate.edu" (not shown). Users of the web site may include students of Jones State University, faculty, potential students, etc. Assume that the user at client terminal 110 is a student who wishes to access their tuition account information from web server 130.

The user may have to click a "students" link on the www.jonesstate.edu home page, where they are taken to a web page for current students, www.jonesstate.edu/students. The user may then POST a first set of credentials, perhaps a relatively low-security username and password set, to be taken to their student web account, www.jonesstate.edu/students/personal. From there, the student may have various web links available to them, such as a link to their semester grades, student email account, and a link to their student tuition account at www.jonesstate.edu/students/personal/studentaccounts. However, to access their tuition account, the student may have to POST a second, more secure userid and password combination to web server 130.

In this example, the user needs to navigate through four distinct web pages and upload two distinct sets of credentials to web server 130, i.e:
(1) navigate to www.jonesstate.edu
(2) navigate to www.jonesstate.edu/students
(3) supply first set of credentials
(4) receive www.jonesstate.edu/students/personal
(5) supply second set of credentials
(6) receive www.jonesstate.edu/students/personal/studentaccounts Hard-coding a program to access the student's tuition account using existing technologies would require the programmer to study the steps taken by the user to access the www.jonesstate.edu/students/personal/studentaccounts page, and the programmer would learn the user's two sets of credentials. Using method 200, the user can simply go through the steps necessary to access their tuition account once, and the user's two sets of credentials would remain undisclosed to third parties. Thus, by going through the steps necessary to access their tuition account a single time, the user is able to "teach" the log retrieval script how to generate a data retrieval script that can automate the process of accessing the tuition account.

Thus, in this example, proxy server 140 will create a record in data log 600 that traces the user's interactions with web server 130. As log processing script 900 on client terminal 110 processes data log 600, it will create a data retrieval script specific to the user actions required to access the www.jonesstate.edu web site and the user's tuition account data. Subsequently, the user can simply execute the data retrieval script to retrieve their tuition account information. The data retrieval script will perform steps analogous to those listed as 1-6 above, i.e. analogous to the steps initially taken by the user to access the tuition account data. In some embodiments, the data retrieval script may be encrypted or otherwise maintained in a secure fashion that prevents confidential information, such as user ids, passwords, and other credentials, from being ascertained by third parties.

Graphical Implementation of Steps S206-S208

In the discussion above, at steps S206-S208 the user specified patterns to search the HTML in the downloaded web pages using command-line tools such as grep and egrep. For users who are familiar with such tools, a graphical interface is not necessary. However, it is also possible to provide a graphical interface to pass arguments to tools such as grep and egrep, for users who are not comfortable with a command-line interface.

For example, a simple dialog box could be used to request a text string from the user for searching the downloaded web pages. If the user has downloaded accounts page 500 and enters "401(k)" into the dialog box, the user could be provided the HTML data corresponding to this location, e.g. "$6,925.00." In further embodiments, various data could be aggregated, such as the total account balances for all of the user accounts listed on accounts page 500.

Log Pruning

In the examples discussed above, it was assumed that the user turned on the data logging, sequentially accessed the various web pages available from web servers 120/130, and then turned off the data logging. In such circumstances, data log 600 will not include entries from other web sites. However, the user may choose to browse various other web sites, perhaps in a different browser tab, as they navigate through their accounts. Thus, data log 600 may include various extraneous entries that do not need to be executed by the data retrieval script.

In such circumstances, it may be desirable to "prune" data log 600 to eliminate irrelevant entries. For example, if the user visited a newspaper web site and a search engine as they checked their account balances, there may be entries for the corresponding HTTP traffic to the newspaper web site, the search engine, and web server 120 all interleaved in data log 600. However, the data retrieval script would not need to visit the newspaper web site or search engine in order to replicate the user's browsing to accounts page 500. Accordingly, it may be desirable to "prune" entries from data log 600 that do not relate to the user's interaction with web server 120.

In the first example, entries could be pruned, for example, by deleting or ignoring those entries in data log 600 that do not include the string "abc123bank." Alternately or in addition, IP addresses or other information identifying web server 120 could be used to prune data log 600.

Cookies and Session Identifiers

Session identifiers such as cookies and tokens may be used in certain embodiments. For example, suppose two users at client terminal 110 log into their respective accounts at www.abc123bank.com. Data log 600 would include duplicative entries, e.g. two HTTP GET requests for each user and an HTTP POST request for each user.

In order to discern which entries correspond to each user, HTTP session identifiers may be included in data log 600. Thus, when log processing script 900 iterates over data log 600, log processing script 900 may use the session identifiers to distinguish between the users. By creating one script per session identifier, the log retrieval script could create two data retrieval scripts, e.g., one for each user. Thus, even though the HTTP traffic for the two users may be interleaved in data log 600, each data retrieval script would only retrieve the data particular to the corresponding user. Log processing script 900 may also distinguish between HTTP sessions that use other session tracking mechanisms, such as hidden variables or URL rewriting.

Architecture

The disclosed embodiments of the invention may utilize a lightweight architecture, though a lightweight architecture is not required. For example, embodiments where proxy server 140 is located on client terminal 110 may be considered a peer-to-peer architecture. Thus, there is no middleware or database sitting between client terminal 110 and the target resource, i.e. web servers 120 and 130. A user may manage his credentials locally on client terminal 110 by, for example, storing a list of usernames and passwords on their local file system. In one embodiment, the list may be encrypted using cryptographic software, such as GNU Privacy Guard or the like. Encryption may be beneficial in protecting the credentials of a user when the credentials are stored on an uncertified third-party server or database. Moreover, the network connection to remote web resources may be protected by HTTPS.

Additionally, some embodiments of the invention may be based on a low-profile implementation and may be built using tools that are not dependent on a specific operating system. Moreover, the generated cURL or other NHCU script may have a relatively small size at less than 1 kilobyte per use case, and may not need to be compiled.

Embodiments of the invention may be used to summarize a financial portfolio. For example, embodiments of the invention may be used to retrieve summary data, such as market values, stock positions, account balances, credit line balances, and the like from multiple financial institutions without user intervention. Predefined shell commands may be stored to implement the aggregation of such data and provide the data to the user in a format that is easily read by a human.

In addition, embodiments of the invention may be used to automate web data collection. This data may include, for example, stock ratings and mortgage credit scores provided by certain financial institutions upon receipt of a user request via web submission (e.g., HTTP POST). The ratings and scores may be generated by complex business logic which is not exposed to the users. Currently, in order to obtain ratings and scores for a wide range of targets (e.g., S&P500™ stock ratings from a research institute), a user has to submit requests repetitively. Embodiments of the invention may help users to obtain multiple ratings and scores without repetitive requests. Embodiments of the invention may also be used to: produce a stock digest which may include Fundamental Analysis (FA) from one institution and Technical Analysis (TA) from another; to receive and aggregate personalized web data from multiple service providers; or to automate generation of corporate security review report containing group/member lists provisioned by multiple web applications, among various other uses.

In some embodiments consistent with the invention, scripts may be automatically-generated using artificial intelligence techniques. Embodiments of the invention may be implemented on a data processing system, such as a desktop personal computer, laptop computer, or mainframe computer. Software implementing embodiments of the invention may be created using known software design and implementation techniques.

CONCLUSION

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described as being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing applications, such as e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method of extracting data from web applications, said method comprising:
   monitoring, by one or more processors, a sequence of web traffic between a web browser of a client terminal and a web server during a plurality of sessions;
   associating, by the one or more processors, the monitored sequence of web traffic with a unique session identifier for each of a plurality of users, wherein the monitored sequence of web traffic corresponds to a sequence of user interactions between the plurality of users and the web browser;
   creating, by the one or more processors, at least one data log capturing one or more transfer protocol requests associated with the monitored sequence of web traffic;
   identifying, by the one or more processors, one or more of the transfer protocol requests that are associated with an activity of accessing private data;
   pruning, by the one or more processors, one or more of the transfer protocol requests in the data log based on the identified one or more of the transfer protocol requests that are associated with the activity of accessing private data except transfer protocol requests corresponding to a unique session identifier for a particular user;
   processing, by the one or more processors, the at least one data log to extract the one or more transfer protocol requests associated with the activity of accessing the private data;
   generating, by the one or more processors, a sequence of commands corresponding to the extracted transfer protocol requests;
   recreating the sequence of monitored web traffic associated with the activity of accessing the private data by executing, by the one or more processors, the sequence of commands;
   extracting, by the one or more processors, the private data; and
   displaying the private data on the client terminal.

2. The method according to claim 1, further comprising:
   adding an entry to the at least one data log reflecting authentication credentials sent from the client terminal to the server,
   wherein at least one of the sequence of commands causes the one or more processors to access the server and send authentication credentials to the server.

3. The method according to claim 2, wherein the authentication credentials comprise a user identification and a password.

4. The method according to claim 2, wherein:
   at least one of the sequence of commands is generated based on an HTTP GET request in the at least one data log, and
   at least one of the sequence of commands is generated based on an HTTP POST request in the at least one data log.

5. The method according to claim 1, wherein the sequence of commands is executable by a command-line utility that implements HTTP protocol.

6. The method according to claim 1, wherein the data log reflects web traffic associated with a plurality of users interacting with the server, and further comprising generating commands to send authentication credentials to the server for each of the plurality of users.

7. The method according to claim 1, wherein the sequence of commands is generated by matching an expression to the one or more transfer protocol requests for the web pages in the at least one data log, and incorporating a URL from the one or more transfer protocol requests into the command.

8. The method according to claim 1, wherein extracting the private data comprises:
   downloading one or more web pages by executing, by the one or more processors, the sequence of commands;
   receiving a user input specifying a pattern;
   searching the one or more downloaded web pages for the pattern;
   extracting a data field associated with the pattern; and
   displaying the extracted data field to the user.

9. A non-transitory computer-readable storage medium comprising instructions for causing a processor to implement a method of extracting data from web applications, said method comprising:
   monitoring, by one or more processors, a sequence of web traffic between a web browser of a client terminal and a web server during a plurality of sessions;
   associating, by the one or more processors, the monitored sequence of web traffic with a unique session identifier for each of a plurality of users, wherein the monitored sequence of web traffic corresponds to a sequence of user interactions between the plurality of users and the web browser;
   creating, by the one or more processors, at least one data log capturing one or more transfer protocol requests associated with the monitored sequence of web traffic;
   identifying, by the one or more processors, one or more of the transfer protocol requests that are associated with an activity of accessing private data;
   pruning, by the one or more processors, one or more of the transfer protocol requests in the data log based on the identified one or more of the transfer protocol requests that are associated with the activity of accessing private data except transfer protocol requests corresponding to a unique session identifier for a particular user;
   processing, by the one or more processors, the at least one data log to extract the one or more transfer protocol requests associated with the activity of accessing the private data;
   generating, by the one or more processors, a sequence of commands corresponding to the extracted transfer protocol requests;
   recreating the sequence of monitored web traffic associated with the activity of accessing the private data by executing, by the one or more processors, the sequence of commands;
   extracting, by the one or more processors, the private data; and
   displaying the private data on the client terminal.

10. The non-transitory computer-readable storage medium according to claim 9, further comprising:
adding an entry to the at least one data log reflecting authentication credentials sent from the client terminal to the server,
wherein at least one of the sequence of commands causes the one or more processors to access the server and send authentication credentials to the server.

11. The non-transitory computer-readable storage medium according to claim 10, wherein the authentication credentials comprise a user identification and a password.

12. The non-transitory computer-readable storage medium according to claim 10, wherein:
at least one of the sequence of commands is generated based on an HTTP GET request in the at least one data log, and
at least one of the sequence of commands is generated based on an HTTP POST request in the at least one data log.

13. The non-transitory computer-readable storage medium according to claim 9, wherein the sequence of commands is executable by a command-line utility that implements HTTP protocol.

14. The non-transitory computer-readable storage medium according to claim 9, wherein the data log reflects web traffic associated with a plurality of users interacting with the server, and further comprising generating commands to send authentication credentials to the server for each of the plurality of users.

15. The non-transitory computer-readable storage medium according to claim 9, wherein the sequence of commands is generated by matching an expression to the one or more transfer protocol requests for the web pages in the at least one data log, and incorporating a URL from the one or more transfer protocol requests into the command.

16. The non-transitory computer-readable storage medium according to claim 9, wherein extracting information comprises:
downloading one or more web pages by executing, by the one or more processors, the sequence of commands;
receiving a user input specifying a pattern;
searching the one or more downloaded web pages for the pattern;
extracting a data field associated with the pattern; and
displaying the extracted data field to the user.

17. A client terminal for extracting data from web applications, said terminal comprising:
one or more processors and a proxy server configured to:
request, by the one or more processors, one or more web pages from a server via a web browser;
extract, by the one or more processors, data from the one or more web pages;
monitor, by the proxy server, a sequence of web traffic between a web browser of a client terminal and a web server during a plurality of sessions;
associate, by the proxy server, the monitored sequence of web traffic with a unique session identifier for each of a plurality of users, wherein the monitored sequence of web traffic corresponds to a sequence of user interactions between the plurality of users and the web browser;
create, by the proxy server, at least one data log capturing one or more transfer protocol requests associated with the monitored sequence of web traffic;
identify, by the one or more processors, one or more of the transfer protocol requests that are associated with an activity of accessing private data;
prune, by the one or more processors, one or more of the transfer protocol requests in the at least one data log based on the identified one or more of the transfer protocol requests that are associated with the activity of accessing private data except transfer protocol requests corresponding to a unique session identifier for a particular user;
process, by the one or more processors, the at least one data log to extract the one or more transfer protocol requests associated with the activity of accessing the private data;
generating, by the one or more processors, a sequence of commands corresponding to the extracted transfer protocol requests;
recreating the sequence of monitored web traffic associated with the activity of accessing the private data by executing, by the one or more processors, the sequence of commands;
extracting, by the one or more processors, the private data; and
displaying the private data on the client terminal.

* * * * *